(12) United States Patent
Louis et al.

(10) Patent No.: US 11,525,033 B2
(45) Date of Patent: Dec. 13, 2022

(54) POLYMER-METAL JUNCTION COMPRISING PEEK-PEMEK COPOLYMER COMPOSITIONS, IN CONTACT WITH A METAL SUBSTRATE

(71) Applicant: SOLVAY SPECIALTY POLYMERS USA, LLC, Alpharetta, GA (US)

(72) Inventors: Chantal Louis, Alpharetta, GA (US); Mohammad Jamal El-Hibri, Atlanta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 123 days.

(21) Appl. No.: 16/771,698

(22) PCT Filed: Dec. 20, 2018

(86) PCT No.: PCT/EP2018/086252
§ 371 (c)(1),
(2) Date: Jun. 11, 2020

(87) PCT Pub. No.: WO2019/122160
PCT Pub. Date: Jun. 27, 2019

(65) Prior Publication Data
US 2021/0179763 A1    Jun. 17, 2021

Related U.S. Application Data

(60) Provisional application No. 62/608,245, filed on Dec. 20, 2017.

(30) Foreign Application Priority Data

Feb. 21, 2018 (EP) ..................... 18157845

(51) Int. Cl.
| | | |
|---|---|---|
| *C08G 65/40* | (2006.01) |
| *B33Y 70/00* | (2020.01) |
| *B29C 64/118* | (2017.01) |
| *C08K 3/26* | (2006.01) |
| *C08F 292/00* | (2006.01) |
| *C08K 3/04* | (2006.01) |
| *C08K 7/06* | (2006.01) |
| *C08K 7/14* | (2006.01) |
| *C09D 161/00* | (2006.01) |
| *B33Y 70/10* | (2020.01) |
| *C08K 7/02* | (2006.01) |
| *C09D 161/16* | (2006.01) |
| *B33Y 10/00* | (2015.01) |
| *B29K 71/00* | (2006.01) |
| *B29K 309/08* | (2006.01) |

(52) U.S. Cl.
CPC ........ *C08G 65/4093* (2013.01); *B29C 64/118* (2017.08); *B33Y 70/00* (2014.12); *B33Y 70/10* (2020.01); *C08F 292/00* (2013.01); *C08G 65/4012* (2013.01); *C08K 3/04* (2013.01); *C08K 3/26* (2013.01); *C08K 7/02* (2013.01); *C08K 7/06* (2013.01); *C08K 7/14* (2013.01); *C09D 161/00* (2013.01); *C09D 161/16* (2013.01); *B29K 2071/00* (2013.01); *B29K 2309/08* (2013.01); *B33Y 10/00* (2014.12); *C08K 2003/262* (2013.01)

(58) Field of Classification Search
CPC ............ C08G 65/4093; C08G 65/4012; C09J 171/00; C09D 161/00; C09D 161/16; C08F 292/00; C08K 3/04; C08K 3/013; C08K 7/06; C08K 7/14; B29C 64/10

See application file for complete search history.

(56) References Cited

U.S. PATENT DOCUMENTS

| | | | | |
|---|---|---|---|---|
| 5,264,520 A | * | 11/1993 | Mullins ................... | C07C 45/46 528/125 |
| 9,133,111 B2 | | 9/2015 | Louis et al. | |
| 9,728,297 B2 | * | 8/2017 | El-Hibri ................... | C08K 3/38 |
| 9,777,156 B2 | * | 10/2017 | El-Hibri ................... | C08L 81/06 |
| 10,519,277 B2 | * | 12/2019 | El-Hibri ................... | C08L 71/08 |
| 2011/0213095 A1 | * | 9/2011 | Louis ................... | C08G 65/4012 525/390 |
| 2017/0096576 A1 | * | 4/2017 | Bheda .................. | G03G 15/225 |
| 2018/0305577 A1 | * | 10/2018 | Bheda .................. | C09D 161/16 |
| 2021/0380762 A1 | * | 12/2021 | Wang ..................... | C08K 7/06 |
| 2022/0002484 A1 | * | 1/2022 | Wang ..................... | C08K 3/013 |
| 2022/0135740 A1 | * | 5/2022 | Sue ..................... | C08G 65/4031 524/592 |

FOREIGN PATENT DOCUMENTS

| | | |
|---|---|---|
| EP | 1559542 A1 | 8/2005 |
| EP | 1459882 B1 | 2/2010 |
| JP | 2004307629 A | 11/2004 |
| WO | 2011123790 A1 | 10/2011 |
| WO | 2016092087 A1 | 6/2016 |
| WO | 2017153290 A1 | 9/2017 |
| WO | WO 2019/122226 A1 | 6/2019 |

OTHER PUBLICATIONS

U.S. Appl. No. 16/771,701, Chantal Louis, filed Jun. 11, 2020.
(Continued)

*Primary Examiner* — Jane L Stanley
(74) *Attorney, Agent, or Firm* — Osha Bergman Watanabe & Burton LLP

(57) ABSTRACT

The present invention generally relates a polymer-metal junction comprising PEEK-PEmEK copolymers compositions, in contact with a metal substrate, wherein the PEEK-PEmEK copolymer having $R_{PEEK}$ and $R_{PEmEK}$ repeat units in a molar ratio $R_{PEEK}/R_{PEmEK}$ ranging from 95/5 to 45/55. The present invention also relates to shaped articles including the polymer-metal junction, and methods of making the polymer-metal junctions.

26 Claims, 1 Drawing Sheet

(56) References Cited

OTHER PUBLICATIONS

ASTM D3418-03—Standard Test Method for Transition Temperatures of Polymers by Differential Scanning Calorimetry, 2003, 7 pages.
ASTM E794-06—Standard Test Method for Melting and Crystallization Temperatures by Thermal Analysis, 2006, 4 pages.
ASTM E793-06—Standard Test Method for Enthalpies effusion and Crystallization by Differentail Scanning Calorimetry, 2006, 4 pages.
ASTM D1002-10, "Standard Test Method for Apparent Shear Strength of Single-Lap-Joint Adhesively Bonded Metal Speciments by Tension Loading (Metal-to-Metal)", 2010, 6 pages.
Murphy J., in "Additives for Plastics Handbook", 2nd Edition, 2001, Chapter 5.2.3., p. 43-48—Elsevier Advanced Technology.
Rama Rao M. et al., "Synthesis, characterization and thermal degradation studies of poly(ether ether ketone) copolymers", POLYMER., vol. 33 No. 13, 1992, pp. 2834-2839, Butterworth-Heinemann Ltd.
Lee C.-J. et al., "Structure and Properties of Poly(arylene etherketone)s containing Resorcinol units", Journal of the Korean Fiber Society, 1993, pp. 50-64.

* cited by examiner

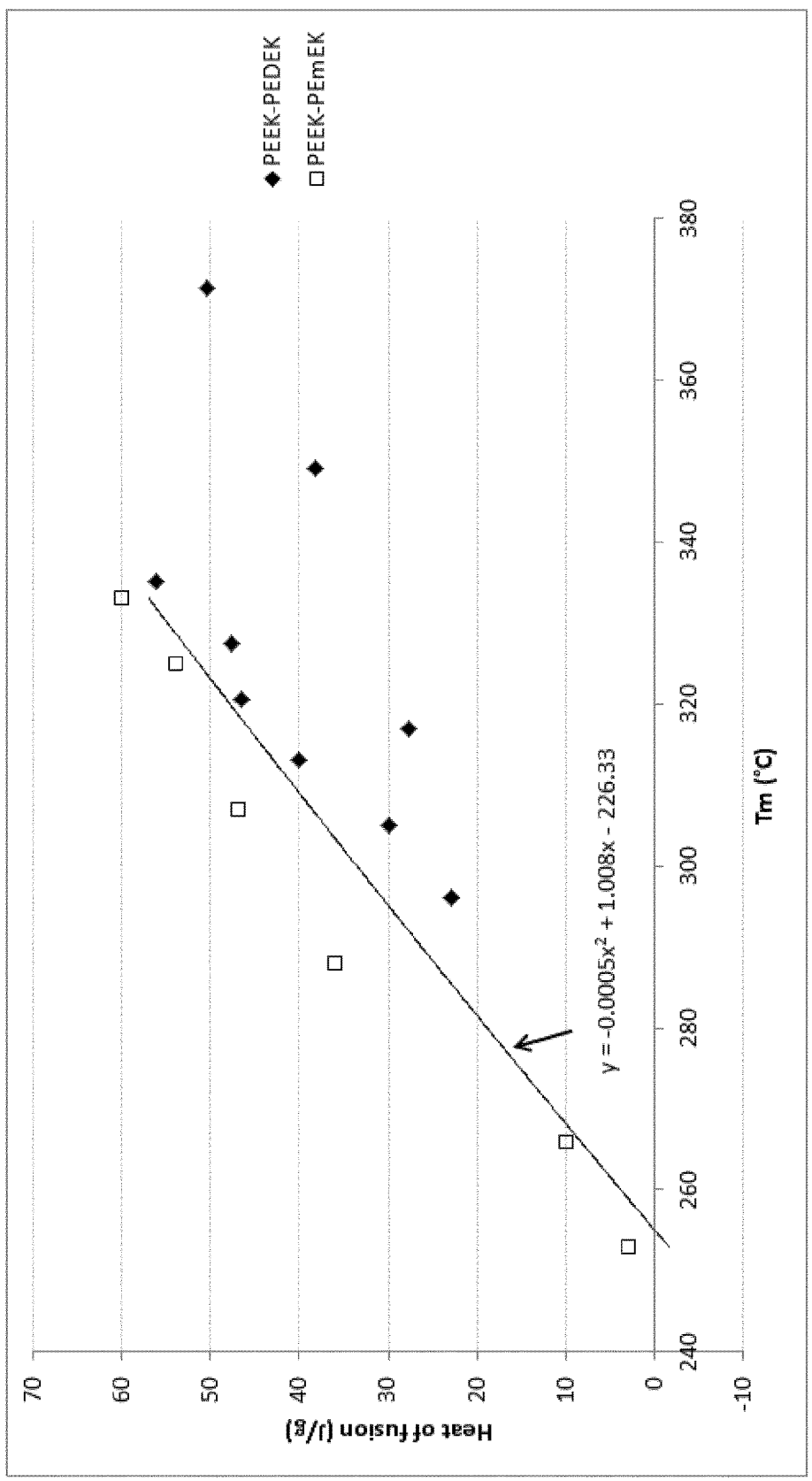

POLYMER-METAL JUNCTION COMPRISING PEEK-PEMEK COPOLYMER COMPOSITIONS, IN CONTACT WITH A METAL SUBSTRATE

CROSS-REFERENCE TO RELATED APPLICATIONS

This application is a U.S. national stage entry under 35 U.S.C. § 371 of International Application No. PCT/EP2018/086252 filed Dec. 20, 2018, which claims priority to U.S. provisional application 62/608,245 filed on Dec. 20, 2017 and to European application 18157845.1 filed on Feb. 21, 2018, the whole content of each of these applications being incorporated herein by reference for all purposes.

FIELD OF THE INVENTION

The present invention generally relates to a polymer-metal junction comprising PEEK-PEmEK copolymers compositions, in contact with a metal substrate, as well as to shaped articles including the polymer-metal junction, for example a coating on a wire or cable or a part of a mobile electronic device, and to methods to prepare the polymer-metal junction and the shaped articles. The copolymer described herein is such that it has $R_{PEEK}$ and $R_{PEmEK}$ repeat units in a molar ratio $R_{PEEK}/R_{PEmEK}$ ranging from 95/5 to 45/55.

BACKGROUND

Poly(aryl ether ketone) polymers (PAEK), such as poly (ether ether ketone) polymers (PEEK), are known for their high temperature performance and excellent chemical resistance; however, because of their melting temperatures (Tm) which are generally too high, their processing temperatures require costlier, energy-intensive processing. Their high melting temperatures (Tm) can also result in polymers being unstable during processing, especially when the polymers must be kept at a temperature above or just below their melting temperature for extended periods of time. Examples of such applications include additive manufacturing (AM), also called 3D printing, powder coatings and continuous fiber thermoplastic composites.

Accordingly, a need exists for new PAEK polymers that can be reliably processed at lower temperatures, and which retain their technical properties, notably their chemical resistance and mechanical properties (when compared with conventional PAEK polymers).

BRIEF DESCRIPTION OF THE FIGURES

FIG. 1 is a plot based on the data in Table 1 comparing the heats of fusion of PEEK-PEDEK and PEEK-PEmEK copolymers at various melting temperatures (Tm).

DETAILED DESCRIPTION

The present invention relates to a polymer-metal junction comprising a PEEK-PEmEK copolymer composition, wherein the copolymer has $R_{PEEK}$ and $R_{PEmEK}$ repeat units in a molar ratio $R_{PEEK}/R_{PEmEK}$ ranging from 95/5 to 45/55, the polymer composition including optionally at least one reinforcing filler, at least one additive, or a combination thereof. The present invention relates to shaped articles including the polymer-metal junction of the present invention. Also described are methods of making the PEEK-PEmEK copolymer, methods of making the polymer-metal junction comprising polymer composition.

The PEEK-PEmEK copolymers described in the present invention having a molar ratio $R_{PEEK}/R_{PEmEK}$ ranging from 95/5 to 45/55 advantageously exhibit a relationship between melting temperature (Tm) and heat of fusion (ΔH) satisfying the inequality:

$$\Delta H \geq -0.0005(Tm)^2 + 1.008(Tm) - 226.33$$

where:

ΔH is the heat of fusion in J/g determined as the area under the melting endotherm on the second heat scan in a differential scanning calorimeter (DSC) according to ASTM D3418-03 and E793-06, using heating and cooling rates of 20° C./min, and Tm is the melting temperature of the PEEK-PEmEK copolymer in ° C. measured as the peak temperature of the melting endotherm on the second heat scan in a differential scanning calorimeter (DSC) according to ASTM D3418-03 and E794-06 and using heating and cooling rates of 20° C./min.

PEEK-PEmEK copolymers meeting this inequality may have, for example, a higher crystallinity (and associated chemical resistance) at a given melting temperature (Tm), as compared with other low melting temperature (Tm) PAEKs known in the art, such as PEEK-PEDEK copolymers.

PEEK-PEmEK Copolymer

As used herein, a "PEEK-PEmEK copolymer" comprises at least 50 mol. %, collectively, of repeat units ($R_{PEEK}$) and repeat units ($R_{PEmEK}$), relative to the total number of moles of repeat units in the PEEK-PEmEK copolymer. In some embodiments, the PEEK-PEmEK copolymer comprises at least 60 mol. %, at least 70 mol. %, at least 80 mol. %, at least 90 mol. %, at least 95 mol. %, and most preferably at least 99 mol. % of repeat units ($R_{PEEK}$) and ($R_{PEmEK}$), relative to the total number of moles of repeat units in the PEEK-PEmEK copolymer.

Repeat unit ($R_{PEEK}$) is represented by formula:

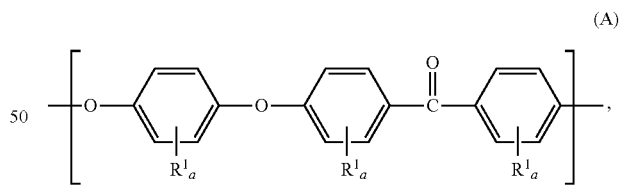

(A)

and repeat unit ($R_{PEmEK}$) is represented by formula:

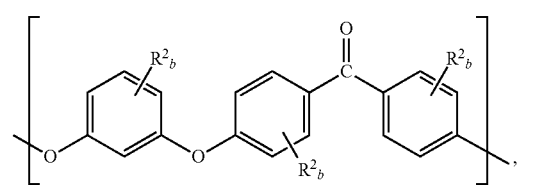

(B)

where each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and each a and b is independently selected from the group consisting of integers ranging from 0 to 4.

In some embodiments, each a is zero, such that the repeat units ($R_{PEEK}$) are repeat units of formula:

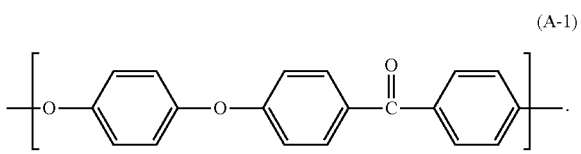

(A-1)

In some embodiments, each b is zero, such that the repeat units ($R_{PEmEK}$) are repeat units of formula:

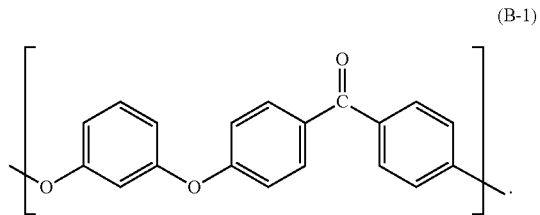

(B-1)

Preferably, repeat units ($R_{PEEK}$) are repeat units of formula (A-1), and repeat units ($R_{PEmEK}$) are repeat units of formula (B-1).

The PEEK-PEmEK copolymer of the present invention may additionally comprise repeat units ($R_{PAEK}$) different from repeat units ($R_{PEEK}$) and ($R_{PEmEK}$), as above detailed. In such case, the amount of repeat units ($R_{PAEK}$) can be comprised between 0.1 and 5 mol. %, with respect to the total number of moles of repeat units of PEEK-PEmEK copolymer.

When repeat units ($R_{PAEK}$) different from repeat units ($R_{PEEK}$) and ($R_{PEmEK}$) are present in the PEEK-PEmEK copolymer of the present invention, these repeat units ($R_{PAEK}$) generally comply with any of the following formulae (K-A) to (K-M) herein below:

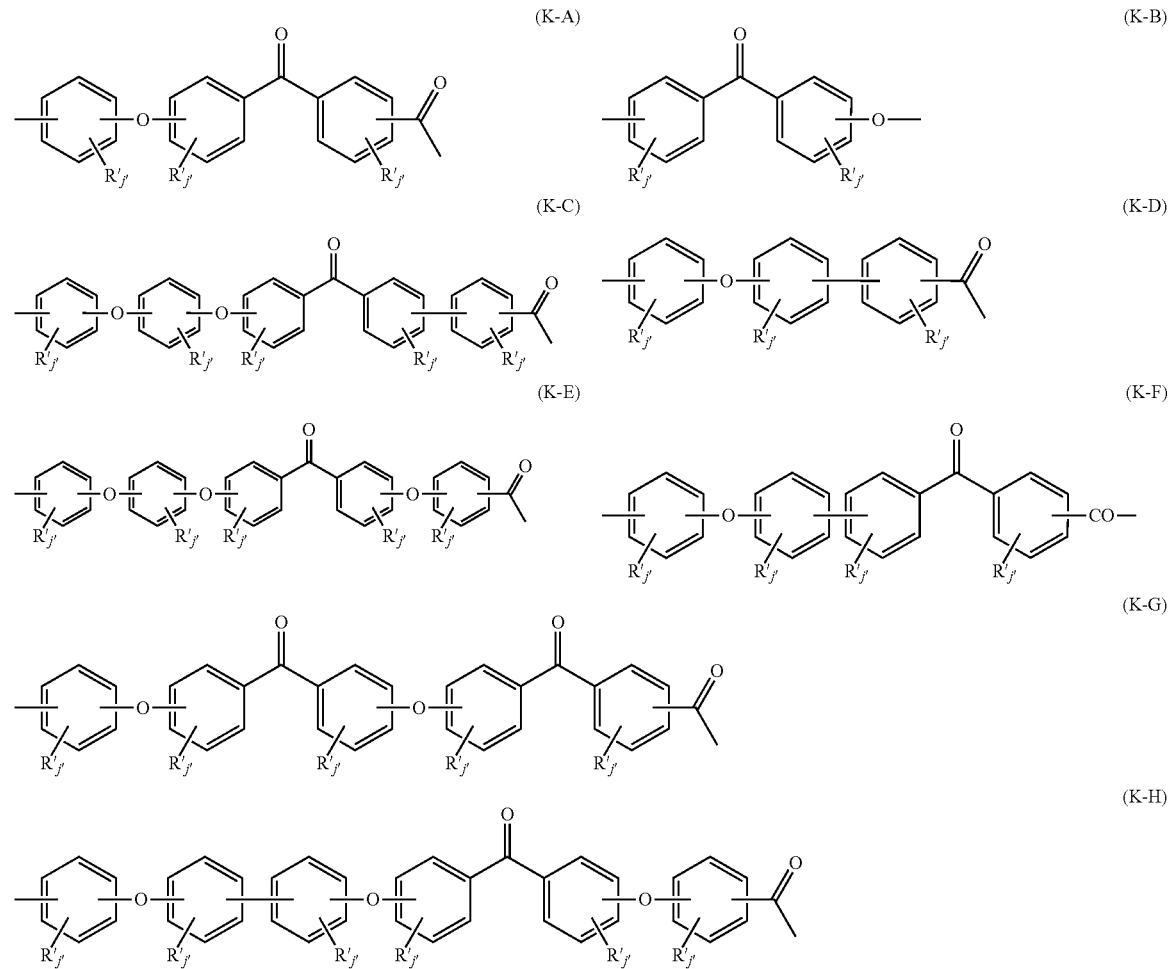

-continued

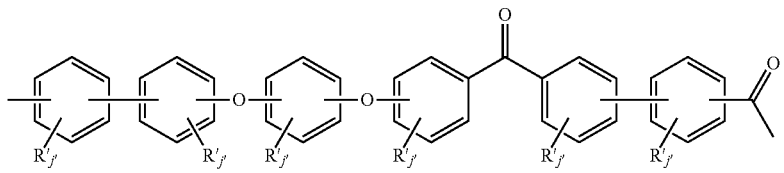
(K-I)

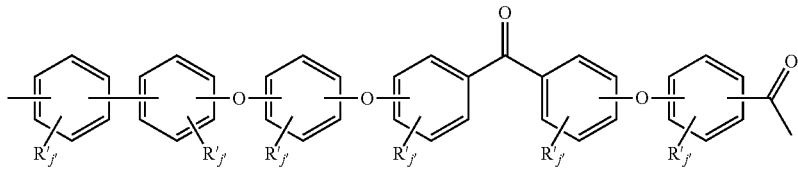
(K-J)

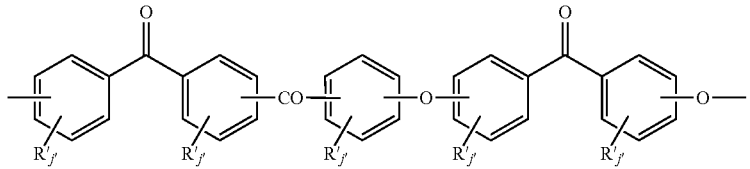
(K-K)

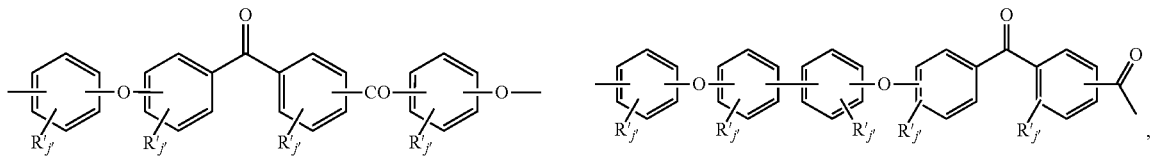

(K-L)                                   (K-M)

wherein in each of formulae (K-A) to (K-M) above, each of R', equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4, preferably j' being equal to zero.

It is nevertheless generally preferred for the PEEK-PEmEK copolymer of the present invention to be essentially composed of repeat units ($R_{PEEK}$) and ($R_{PEmEK}$), as above detailed. Thus, in some embodiments, the PEEK-PEmEK copolymer consists essentially of repeat units $R_{PEEK}$ and $R_{PEmEK}$. As used herein, the expression "consists essentially of repeat units $R_{PEEK}$ and $R_{PEmEK}$" means that any additional repeat unit different from repeat units $R_{PEEK}$ and $R_{PEmEK}$, as above detailed, may be present in the PEEK-PEmEK copolymer in amount of at most 1 mol. %, at most 0.5 mol. % or at most 0.25 mol. %, relative to the total number of moles of repeat units in the PEEK-PEmEK copolymer, and so as not to substantially alter the advantageous properties of the PEEK-PEmEK copolymer.

Repeat units $R_{PEEK}$ and $R_{PEmEK}$ are present in the PEEK-PEmEK copolymer in a $R_{PEEK}/R_{PEmEK}$ molar ratio ranging from 95/5 to 45/55, preferably from 95/5 to 50/50, from 90/10 to 50/50, from 85/15 to 58/42.

In some embodiments, the PEEK-PEmEK copolymer has a melting temperature (Tm) of less than or equal to 335° C., preferably less than or equal to 325° C. The melting temperatures described herein are measured as the peak temperature of the melting endotherm on the second heat scan in a differential scanning calorimeter (DSC) according to ASTM D3418-03 and E794-06, and using heating and cooling rates of 20° C./min.

In some embodiments, the PEEK-PEmEK copolymer has as heat of fusion (ΔH) of at least 1 J/g, preferably at least 5 J/g, at least 10 J/g, at least 15 J/g, or at least 25 J/g. The heats of fusion described herein are determined as the area under the melting endotherm on the second heat scan in a differential scanning calorimeter (DSC) according to ASTM D3418-03 and E793-06, with heating and cooling rates of 20° C./min. In some aspects, the PEEK-PEmEK copolymer has as heat of fusion (ΔH) of at most 65 J/g, preferably at most 60 J/g.

In some embodiments, the PEEK-PEmEK copolymer exhibits a tensile modulus of at least 550 ksi, preferably at least 600 ksi as measured according to ASTM D638 at room temperature.

In some embodiments, the PEEK-PEmEK copolymer has a glass transition temperature (Tg) of less than or equal to 155° C., preferably less than or equal to 145° C., less than or equal to 140° C., or less than or equal to 135° C. as measured in a differential scanning calorimeter (DSC) according to ASTM D3418-03 and E1356-03.

In some embodiments, the PEEK-PEmEK copolymer has a melt viscosity (MV) as measured according to ASTM D3835 at 410° C., 46.3 $s^{-1}$ ranging from 0.10 to 5.0 $kN/m^2$, preferably ranging from 0.15 to 3.0 $kN/m^2$, more preferably from 0.15 to 2.0 $kN/m^2$, most preferably from 0.15 to 1.5 $kN/m^2$.

Method of Making the PEEK-PEmEK Copolymer

The method of making the PEEK-PEmEK copolymer described above comprises reacting at least one difluorocompound of formula (C):

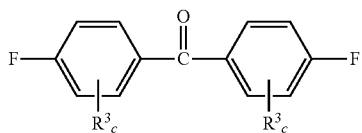

with a mixture of di-hydroxy compounds of formulas (D) and (E):

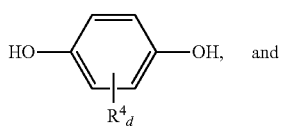

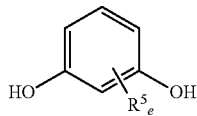

in a molar ratio (D)/(E) ranging from 95/5 to 45/55, wherein each $R^3$, $R^4$, and $R^5$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium, and each c, d, and e is independently selected from the group consisting of integers ranging from 0 to 4, in a polar organic solvent in the presence of a base, such as, for example, $Na_2CO_3$, $K_2CO_3$, or a combination thereof. Preferably each of c, d, and e is zero.

Preferably, the compound of formula (C) is 4,4'-difluorobenzophenone (DFBP). Preferably, the compound of formula (D) is hydroquinone. Preferably, the compound of formula (E) is resorcinol. In some embodiments, the compound of formula (C) is 4,4'-difluorobenzophenone (DFBP), the compound of formula (D) is hydroquinone, and the compound of formula (E) is resorcinol.

Polar organic solvents possessing suitable solubilisation ability with respect to the cited monomers, and suitable thermal resistance at the polycondensation temperatures can be used. Preference is given to high boiling aprotic polar solvents; diphenysulfone is a preferred solvent, and is generally used in the method of the present invention as solvent comprising limited amounts of impurities, as detailed in U.S. Pat. No. 9,133,111 to Solvay Advanced Polymers, LLC.

It is also preferable that the compounds (C), (D) and (E) are heated in the method of the invention at a first temperature of at least 130° C., preferably at least 140° C., more preferably at least 150° C. before being contacted with the base, preferably $Na_2CO_3$ and/or $K_2CO_3$. The reaction mixture is then heated at a temperature of at least 260° C., preferably at least 280° C., at a temperature ramp rate of less than 5° C./minute, preferably less than 3° C./minute and/or at a temperature ramp rate of more than 0.1° C./minute. As described in the Examples, once the final target temperature is attained, the reaction is generally continued for a limited time at this temperature, before being terminated.

The Polymer Composition

The PEEK-PEmEK copolymer can be desirably incorporated into polymer compositions. The polymer composition includes the PEEK-PEmEK copolymer and at least one of a reinforcing filler, as described below, or at least one additive, different from the reinforcing filler as described below, or a combination thereof. The polymer composition comprises at least 10 wt. %, at least 20 wt. %, at least 30 wt. % of the polymer composition, based on the total weight of the polymer composition. In some embodiments, the polymer composition comprises PEEK-PEmEK copolymer represents at least 50 wt. %, preferably at least 60 wt. %, at least 70 wt. %, at least 80 wt. %, at least 90 wt. %, at least 95 wt. %, at least 99 wt. % of the PEEK-PEmEK copolymer, based on the total weight of the polymer composition. In some embodiments, the polymer composition comprises less than 50 wt. %, preferably less than 45 wt. %, more preferably less than 40 wt. % of the PEEK-PEmEK copolymer, based on the total weight of the polymer composition.

Reinforcing Fillers

In some embodiments, the polymer composition includes at least one reinforcing filler. Reinforcing fillers are well known to those of skill in the art. They are preferably selected from fibrous and particulate fillers different from the pigments as described below. More preferably, the reinforcing filler is selected from mineral fillers (such as talc, mica, kaolin, calcium carbonate, calcium silicate, magnesium carbonate, boron nitride), glass fiber, carbon fibers, synthetic polymeric fiber, aramid fiber, aluminum fiber, titanium fiber, magnesium fiber, boron carbide fibers, boron nitride fibers, rock wool fiber, steel fiber, wollastonite, etc. Nano-scale reinforcing fillers can also be used. These fillers include: single and multi-wall carbon nanotubes, carbon nanofibers, graphene, graphene oxide, and nanoclays such as montmorillonite. Still more preferably, it is selected from mica, kaolin, calcium silicate, magnesium carbonate, glass fiber, carbon fibers and wollastonite.

Preferably, the filler is chosen from fibrous fillers. A particular class of fibrous fillers consists of whiskers, i.e. single crystal fibers made from various raw materials, such as $Al_2O_3$, SiC, BC, Fe and Ni.

In one embodiment of the present invention the reinforcing filler is chosen from wollastonite and glass fiber. Among fibrous fillers, glass fibers are preferred; they include chopped strand A-, E-, C-, D-, S-, T- and R-glass fibers, as described in chapter 5.2.3, p. 43-48 of Additives for Plastics Handbook, $2^{nd}$ edition, John Murphy.

Glass fibers optionally comprised in polymer composition may have a circular cross-section or a non-circular cross-section (such as an oval or rectangular cross-section).

When the glass fibers used have a circular cross-section, they preferably have an average glass fiber diameter of 3 to 30 μm and particularly preferred of 5 to 12 μm. Different sorts of glass fibers with a circular cross-section are available on the market depending on the type of the glass they are made of. One may notably cite glass fibers made from E- or S-glass.

In some embodiments, the glass fiber is standard E-glass material with a non-circular cross section. In some aspects, the polymer composition includes S-glass fibers with a round cross-section.

In some embodiments, the polymer composition includes at least one carbon fiber. As used herein, the term "carbon fiber" is intended to include graphitized, partially graphitized, and ungraphitized carbon reinforcing fibers or a mixture thereof. The carbon fibers can be obtained by heat treatment and pyrolysis of different polymer precursors such as, for example, rayon, polyacrylonitrile (PAN), aromatic polyamide or phenolic resin; carbon fibers may also be obtained from pitchy materials. The term "graphite fiber" is intended to denote carbon fibers obtained by high temperature pyrolysis (over 2000° C.) of carbon fibers, wherein the carbon atoms place in a way similar to the graphite structure. The carbon fibers are preferably chosen from the group consisting of PAN-based carbon fibers, pitch based carbon fibers, graphite fibers, and mixtures thereof.

In some embodiments, the polymer composition comprises less than 60 wt. %, more preferably less than 50 wt. %, even more preferably less than 45 wt. %, most preferably less than 35 wt. % of reinforcing filler, based on the total weight of the polymer composition.

In some embodiments, the polymer composition comprises at least 10 wt. %, preferably at least 20 wt. %, preferably at least 25%, most preferably at least 30 wt. % of reinforcing filler, based on the total weight of the polymer composition.

Additives

In some embodiments, the polymer composition comprises at least one additive different from the reinforcing filler and from the PEEK-PEmEK copolymer, as above detailed, generally selected from the group consisting of (i) colorants such as a dye (ii) pigments such as titanium dioxide, zinc sulfide and zinc oxide (iii) light stabilizers, e.g. UV stabilizers, (iv) heat stabilizers, (v) antioxidants such as organic phosphites and phosphonites, (vi) acid scavengers, (vii) processing aids, (viii) nucleating agents, (ix) internal lubricants and/or external lubricants, (x) flame retardants, (xi) smoke-suppressing agents, (x) anti-static agents, (xi) anti-blocking agents, (xii) conductivity additives such as carbon black and carbon nanofibrils, (xiii) plasticizers, (xiv) flow modifiers (xv), extenders, (xvi) metal deactivators and (xvii) flow aid such as silica.

In some embodiments, the polymer composition includes less than 20 wt. % of additives, preferably less than 10 wt. %, more preferably less than 5 wt. % and even more preferably less than 2 wt. % of additives, most preferably less than 1 wt. %.

In some embodiments, the polymer composition comprises as an additive 40 wt. % or less of at least one poly(aryl ether sulfone) (PAES) selected from the group consisting of a polysulfone (PSU), a polyphenylsulfone (PPSU), and a poly(ether sulfone) (PES), based on total weight of the polymer composition.

In some embodiments, the polymer composition comprises as an additive 40 wt. % or less of at least one poly(aryl ether ketone) (PAEK) polymers, for example a poly(ether ether ketone) (PEEK) polymer.

In alternative embodiments, the PEEK-PEmEK copolymer, as above detailed, is the only polymeric component in the polymer composition. As used herein, the expression "polymeric component" means a compound having repeat units and a molecular weight of at least 2,000 g/mol. In some embodiments, the polymer composition includes less than 3 wt. %, 2 wt. %, 1 wt. %, 0.5 wt. % of a polymeric component other than the PEEK-PEmEK copolymer.

Methods of Making the Polymer Composition

The polymer composition can be prepared by a variety of methods involving intimate admixing of the components of the polymer composition, for example by dry blending, suspension or slurry mixing, solution mixing, melt mixing or a combination of dry blending and melt mixing. As used herein, the "components of the polymer composition" includes the PEEK-PEmEK copolymer, as above detailed, and at least one of the at least one reinforcing filler, the at least one additive, and of a combination thereof.

Typically, the dry blending of the components of the polymer composition is carried out by using high intensity mixers, such as Henschel-type mixers, paddle mixers or ribbon mixers to obtain the polymer composition as a physical mixture.

Alternatively, the intimate admixing of the components of the polymer composition is carried out by tumble blending based on a single axis or multi-axis rotating mechanism to obtain a physical mixture.

Alternatively, the slurry mixing of the components of the polymer composition is carried out by slurrying the components of the polymer composition using an agitator in an appropriate liquid, such as, for example, methanol, followed by filtering the liquid away, to obtain a powder mixture of the components of the polymer composition.

The solution mixing of the components of the polymer composition can be carried out by mixing the components with an agitator in at least one solvent such as, for example, diphenyl sulfone, benzophenone, 4-chlorophenol, 2-chlorophenol, or meta-cresol.

In some embodiments, the method of making the polymer composition includes melt compounding the physical mixture. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

In some embodiments, the physical mixture is compounded in an extruder and then chopped into pellets or granules. The granules or pellets can then be further processed to manufacture additional shaped articles.

Polymer-Metal Junction and Methods of Making

According to the present invention, the shaped article includes a polymer-metal junction. The polymer-metal junction comprises the polymer composition, as described above, in contact with a metal substrate.

The metal substrate can include any metallic composition including, but not limited to, aluminum, copper, gold, iron, nickel, platinum, silver, steel, and blends or alloys thereof (e.g., brass and bronze). The metal substrate is preferably copper, steel, aluminum, or a combination thereof, most preferably aluminum.

In some embodiments, the metal substrate (e.g. an aluminum substrate) has a structured metal surface. "Structured metal surface" as used herein means a metal surface that has undergone any etching process to roughen the metal surface by removing at least part of the metal. Examples of structured metal surfaces include laser etched metal surfaces and chemically etched metal surfaces. In some embodiments, the metal surface is an un-etched metal surface.

In some aspects, the metal substrate is a nano-structured metal surface. "Nano-structured metal surface" means a metal surface that has been etched to have a nano-pitted surface with surface peaks and valleys having average depth, height and width dimensions in the nano-scale regime ranging from 10 to 1000 nm, preferably from 30 to 800 nm, and more preferably from 50 to 500 nm. In some embodiments, the metal substrate includes an NMT-treated metal surface. An "NMT-treated metal surface" means a nano-structured surface prepared by any etching/priming process described in EP1459882 B1, EP1559542 A1, or WO 2011123790 A1, the disclosures of which are incorporated herein by reference in their entireties.

In some embodiments, the metal substrate is a wire or cable. In alternative embodiments, the metal substrate is a part of a mobile electronic device.

In some embodiments, the polymer-metal junction includes a layer of the polymer composition having a thickness ranging from 0.025 mm to 3 mm.

The polymer-metal junction can be made by contacting the polymer composition as described herein with the metal substrate, preferably a structured metal surface, more preferably a nano-structured metal surface, most preferably an NMT-treated metal surface. For example, the polymer composition may be deposited on or over-molded onto the metal substrate using any suitable melt-processing and deposition method. In particular, the polymer-metal junction may be made by injection or compression molding, or coating the polymer composition onto the metal substrate. The polymer-metal junction can also be formed by an electrostatic or solvent-borne powder coating process. In some aspects, the polymer-metal junction can be formed by an extrusion process for coating a wire or cable. In alternative embodiments the polymer-metal junction is made by an additive manufacturing process.

In some aspects, the metal substrate comprises a nano-structured metal surface.

In some aspects, the polymer composition exhibits a lap shear strength of at least 15 MPa, at least 16 MPa, at least 17 MPa, preferably at least 18 MPa, to a nano-structured aluminum surface as measured according to ASTM D1002.

Shaped Articles and Methods of Making

Exemplary embodiments also include shaped articles including a polymer-metal junction comprising the above-described polymer composition and methods of making the shaped articles.

The shaped article can include one or more parts. When the shaped article is a single part, the single part preferably consists of the polymer composition in contact with a metal substrate.

Alternatively, the shaped article may consist of more than one part, one or more of which preferably consists of the polymer composition in contact with a metal substrate. When more than one part of the shaped article includes the polymer composition, each part may include the same polymer composition or a different polymer composition as described herein, as well as different metal substrates.

The weight of the polymer composition, based on the total weight of shaped article, is preferably greater than 1 wt. %, greater than 5 wt. %, greater than 10 wt. %, preferably greater than 15 wt. %, greater than 20 wt. %, greater than 30 wt. %, greater than 40 wt. %, greater than 50 wt. %, greater than 60 wt. %, greater than 70 wt. %, greater than 80 wt. %, greater than 90 wt. %, greater than 95 wt. % and greater than 99 wt. %.

The polymer composition may be well suited for the manufacture of articles useful in a wide variety of applications. For example, the properties of the PEEK-PEmEK copolymer described herein makes the polymer composition especially suitable for use in automotive applications such as magnet wire coatings in hybrid and electric vehicles, oil and gas applications such as downhole cable coatings, structural components for mobile electronic devices (e.g., framework or housing), thermoplastic composites for structural and transportation applications, electrostatic powder coatings on metal substrates for corrosion protection and abrasion resistance, and parts produced by additive manufacturing for a wide range of applications.

The term "mobile electronic device" is intended to denote any electronic device that is designed to be conveniently transported and used in various locations while exchanging/providing access to data, e.g. through wireless connections or mobile network connection. Representative examples of mobile electronic devices include mobile phones, personal digital assistants, laptop computers, tablet computers, radios, cameras and camera accessories, watches, calculators, music players, global positioning system receivers, portable games, hard drives and other electronic storage devices, and the like.

The shaped article may be selected from a large list of articles such as fitting parts; such as seals, in particular sealing rings, preferably backup seal rings, fasteners and the like; snap fit parts; mutually moveable parts; functional elements, operating elements; tracking elements; adjustment elements; carrier elements; frame elements; films; switches; connectors; wires, cables; bearings, housings, compressor components such as compressor valves and compressor plates, shafts, shells, or pistons.

In particular, the polymer composition is very well suited for use as a coating for wires or cables, as a structural part of a mobile electronic devices, or as a part produced by additive manufacturing. Thus, exemplary embodiments also include shaped articles made, at least in part, by the additive manufacturing methods described below using the polymer composition described above. Such shaped articles can be used in a variety of final applications such as implantable medical devices, dental prostheses, and brackets and complex shaped parts in the aerospace and automotive industries.

Methods of Making the Shaped Articles

The shaped articles described herein can be made from the polymer composition by injection molding, extrusion molding, compression molding, additive manufacturing, continuous fiber impregnation, and continuous fiber composite lamination/consolidation or other shaping technologies.

In some embodiments, the method of making the shaped article or part thereof includes a step of compression molding or injection molding, and subsequent solidification of the polymer composition.

In some embodiments, the method for making the shaped article or shaped article or part thereof includes a step of coating. For example, the polymer composition can be applied to a wire as a coating by any suitable coating method, preferably by extrusion coating around a wire to form a coated wire, preferably a coated magnet wire.

Exemplary embodiments are also directed to methods of making shaped articles by additive manufacturing, where the shaped article is printed from the polymer composition. The methods include printing layers of the shaped article from the polymer composition as described below.

Additive manufacturing systems are used to print or otherwise build a shaped object from a digital representation of the shaped object by one or more additive manufacturing techniques. Examples of commercially available additive manufacturing techniques include extrusion-based techniques, selective laser sintering, powder/binder jetting, electron-beam melting, and stereolithography processes. For each of these techniques, the digital representation of the shaped object is initially sliced into multiple horizontal layers. For each layer, a tool path is then generated, which provides instructions for the particular additive manufacturing system to print the given layer.

For example, in an extrusion-based additive manufacturing system, a shaped article may be printed from a digital representation of the shaped article in a layer-by-layer manner by extruding and adjoining strips of the polymer composition. The polymer composition is extruded through an extrusion tip carried by a print head of the system, and is deposited as a sequence of roads on a platen in an x-y plane. The extruded material fuses to previously deposited material and solidifies as it cools. The position of the print head relative to the substrate is then incremented along a z-axis (perpendicular to the x-y plane), and the process is repeated to form a shaped article resembling the digital representation. An example of an extrusion-based additive manufacturing system is Fused Filament Fabrication (FFF).

As another example, in a powder-based additive manufacturing system, a laser is used to locally sinter powder into a solid part. A shaped article is created by sequentially depositing a layer of powder followed by a laser pattern to sinter an image onto that layer. An example of a powder-based additive manufacturing system is Selective Laser Sintering (SLS).

As another example, carbon-fiber composite shaped articles can be prepared using a continuous Fiber-Reinforced Thermosplastic (FRTP) printing method. This method is based on fused-deposition modeling (FDM) and prints a combination of fibers and resin.

The advantageous properties of the polymer composition discussed above make the polymer composition particularly suitable for additive manufacturing applications.

Accordingly, some embodiments include a method of making a shaped article comprising printing layers of the polymer composition to form the shaped article by an extrusion-based additive manufacturing system (for example FFF), a powder-based additive manufacturing system (for example SLS), or a continuous Fiber-Reinforced Thermosplastic (FRTP) printing method.

According to some embodiments, the polymer composition is in the form of microparticles or a powder, for example having an average diameter ranging from 1 to 200 μm, preferably from 10 to 100 μm, preferably from 20 to 80 μm as measured by electron microscopy or laser scattering.

Exemplary embodiments will now be described in the following non-limiting examples.

EXAMPLES

Materials

KetaSpire® PEEK KT-880P and KT-820P are PEEK polymers available from Solvay Specialty Polymers USA, LLC.

Cypek® PEKK DS-E is an amorphous poly(ether ketone ketone) (PEKK) available from Solvay Specialty Polymers USA.

Hydroquinone, photo grade, available from Eastman, USA. It contained 0.38 wt. % moisture. This information was used to adapt the charge weights. All weights indicated include moisture.

Resorcinol, ACS reagent grade, available from Aldrich, USA.

4,4'-Biphenol, polymer grade is available from SI, USA.

4,4'-Difluorobenzophenone, polymer grade, is available from Jintan, China.

Diphenyl sulfone (polymer grade), available from Proviron (99.8% pure).

Sodium carbonate, light soda ash, available from Solvay S.A., France, dried at 120° C./100 Torr for 12 h.

Potassium carbonate with a d90<45 μm, available from Armand products, dried at 120° C./100 Torr for 12 h.

Lithium chloride (anhydrous grade), available from Acros.

AGY S2 glass fiber (9 μm nominal filament diameter and 553 sizing).

Aluminum A-6061 substrates (NMT-treated aluminum coupons) obtained from Taiseiplas.

Preparation of Polymer Compositions of Examples and Comparative Examples

Comparative Example 1

Comparative Example 1 was KetaSpire® PEEK KT-820P.

Comparative Example 2: Preparation of 95/5 PEEK-PEDEK Copolymer

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 121.86 g of diphenyl sulfone (DPS), 25.707 g of hydroquinone, 2.281 g of 4,4'-biphenol (BP) and 54.261 g of 4,4'-difluorobenzophenone (4,4'-DFBP). The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 26.8764 g of $Na_2CO_3$ and 0.1693 g of $K_2CO_3$ was added via a powder dispenser to the reaction mixture over 30 minutes. At the end of the addition, the reaction mixture was heated to 320° C. at 1° C./minute. After 10 minutes at 320° C., 6.415 g of 4,4'-difluorobenzophenone (4,4'-DFBP) were added to the reaction mixture while keeping a nitrogen purge on the reactor. After 5 minutes, 0.418 g of lithium chloride (LiCl) were added to the reaction mixture. 10 minutes later, another 2.138 g of 4,4'-difluorobenzophenone (4,4'-DFBP) were added to the reactor and the reaction mixture was kept at temperature for 15 minutes.

The reactor content was then poured from the reactor into a SS pan and cooled. The solid was broken up and ground in an attrition mill through a 2 mm screen. DPS and salts were extracted from the mixture with acetone and water at pH between 1 and 12. The powder was then removed from the reactor and dried at 120° C. under vacuum for 12 hours yielding 65 g of a white powder.

The repeat unit of the polymer is:

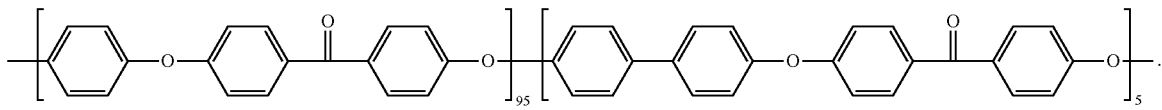

Comparative Examples 3-10: Preparation of Various PEEK-PEDEK Copolymers

The same procedure as Comparative Example 2 was followed except using the following amounts of reagents (Tables 1 and 2):

TABLE 1

|  | CE3 | CE4 | CE5 | CE6 |
|---|---|---|---|---|
| PEEK-PEDEK | 90/10 | 85/15 | 80/20 | 75/25 |
| DPS (g) | 123.45 | 127.70 | 127.70 | 128.21 |
| Hydroquinone (g) | 24.354 | 23.508 | 21.861 | 20.295 |
| BP (g) | 4.562 | 6.993 | 9.207 | 11.405 |
| 4,4'-DFBP (g) | 54.261 | 55.531 | 54.835 | 54.368 |
| Na$_2$CO$_3$ (g) | 26.876 | 27.530 | 27.339 | 26.876 |
| K$_2$CO$_3$ (g) | 0.169 | 0.173 | 0.171 | 0.169 |
| 1$^{st}$ step termination 4,4'-DFBP (g) | 6.415 | 3.822 | 6.577 | 6.415 |
| 2$^{nd}$ step termination LiCl (g) | 0.418 | 1.061 | 1.285 | 0.418 |
| 3$^{rd}$ step termination 4,4'-DFBP (g) | 2.138 | 2.184 | 2.192 | 2.138 |

TABLE 2

|  | CE7 | CE8 | CE9 | CE10 |
|---|---|---|---|---|
| PEEK-PEDEK | 70/30 | 60/40 | 50/50 | 40/60 |
| DPS (g) | 129.80 | 287.65 | 288.96 | 145.87 |
| Hydroquinone (g) | 18.942 | 35.123 | 28.718 | 9.940 |
| BP (g) | 13.686 | 39.477 | 48.415 | 25.138 |
| 4,4'-DFBP (g) | 54.368 | 116.455 | 114.258 | 49.831 |
| Na$_2$CO$_3$ (g) | 26.876 | 58.141 | 57.044 | 24.682 |
| K$_2$CO$_3$ (g) | 0.1524 | 0.366 | 0.359 | 0.1555 |
| 1$^{st}$ step termination 4,4'-DFBP (g) | 6.415 | 13.878 | 13.616 | 5.892 |
| 2$^{nd}$ step termination LiCl (g) | 0.418 | 0.904 | 0.887 | 0.384 |
| 3$^{rd}$ step termination 4,4'-DFBP (g) | 2.138 | 4.626 | 4.539 | 1.964 |

Comparative Example 11

Comparative Example 11 was Cypek® PEKK DS-E.

Inventive Example 12: Preparation of 95/5 PEEK-PEmEK Copolymer

In a 500 mL 4-neck reaction flask fitted with a stirrer, a N$_2$ inlet tube, a Claisen adapter with a thermocouple plunging in the reaction medium, and a Dean-Stark trap with a condenser and a dry ice trap were introduced 128.62 g of diphenyl sulfone, 27.491 g of hydroquinone, 1.443 g of resorcinol and 57.854 g of 4,4'-difluorobenzophenone. The flask content was evacuated under vacuum and then filled with high purity nitrogen (containing less than 10 ppm O2). The reaction mixture was then placed under a constant nitrogen purge (60 mL/min).

The reaction mixture was heated slowly to 150° C. At 150° C., a mixture of 28.741 g of Na$_2$CO$_3$ and 0.181 g of K$_2$CO$_3$ was added via a powder dispenser to the reaction mixture over 30 minutes. At the end of the addition, the reaction mixture was heated to 320° C. at 1° C./minute. After 13 minutes at 320° C., 6.860 g of 4,4'-difluorobenzophenone were added to the reaction mixture while keeping a nitrogen purge on the reactor. After 5 minutes, 0.447 g of lithium chloride were added to the reaction mixture. 10 minutes later, another 2.287 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 100° C. under vacuum for 12 hours yielding 70 g of a light brown powder.

The repeat unit of the polymer is:

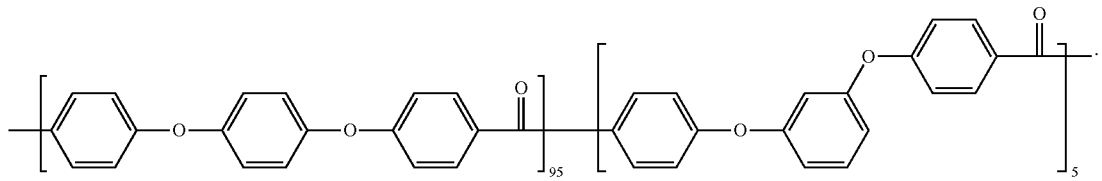

The melt viscosity measured by capillary rheology at 410° C., 46 s$^{-1}$ was 1.12 kN·s/m$^2$.

Inventive Examples 13-17 and Comparative Example 18: Preparation of Various PEEK-PEmEK Copolymers The same procedure as Example 12 was followed except using the following amounts of reagents (table 3):

TABLE 3

|  | E13 | E14 | E15 | E16 | E17 | CE18 |
|---|---|---|---|---|---|---|
| PEEK-PEmEK | 90/10 | 80/20 | 70/30 | 60/40 | 50/50 | 40/60 |
| DPS (g) | 128.62 | 396.9 | 396.9 | 396.9 | 128.62 | 128.62 |
| Hydroquinone (g) | 26.044 | 52.133 | 45.616 | 39.099 | 14.469 | 11.575 |
| Resorcinol (g) | 2.885 | 12.995 | 19.493 | 25.990 | 14.427 | 17.312 |
| 4,4'-DFBP (g) | 57.854 | 132.08 | 132.08 | 132.08 | 58.655 | 58.655 |
| Na$_2$CO$_3$ (g) | 28.741 | 64.723 | 64.723 | 64.723 | 28.741 | 28.741 |
| K$_2$CO$_3$ (g) | 0.181 | 0.408 | 0.408 | 0.408 | 0.181 | 0.181 |
| 1$^{st}$ step termination 4,4'-DFBP (g) | 6.860 | 15.449 | 15.449 | 15.449 | 6.860 | 13.720 |
| 2$^{nd}$ step termination LiCl (g) | 0.447 | 1.006 | 1.006 | 1.006 | 0.447 | 0.447 |
| 3$^{rd}$ step termination 4,4'-DFBP (g) | 2.287 | 5.150 | 5.150 | 5.150 | 2.287 | 2.287 |
| Melt viscosity (kN · s/m$^2$) | 0.70 | 2.36 | 2.92 | 2.24 | 2.57 | 13.6 |

Analytical Methods

Determination of Melting Temperature (Tm)

The melting temperature (Tm) was determined as the peak temperature of the melting endotherm on the second heat scan in a differential scanning calorimeter (DSC) according to ASTM D3418-03 and E794-06 and using heating and cooling rates of 20° C./min.

A TA Instruments DSC Q20 was used with nitrogen as carrier gas (99.998% purity, 50 mL/min). Temperature and heat flow calibrations were performed using indium. Sample size was 5 to 7 mg. The weight was recorded ±0.01 mg. The heat cycles were:

1st heat cycle: 30.00° C. to 400.00° C. at 20.00° C./min, isothermal at 400.00° C. for 1 min;
1st cool cycle: 400.00° C. to 30.00° C. at 20.00° C./min, isothermal for 1 min;
2nd heat cycle: 30.00° C. to 400.00° C. at 20.00° C./min, isothermal at 400.00° C. for 1 min.

The melting temperature (Tm) was determined as the peak temperature of the melting endotherm on the second heat scan. The melting of the composition was taken as the area over a linear baseline drawn from 160° C. to a temperature above the last endotherm.

Determination of Glass Transition Temperature (Tg)

The glass transition temperature (Tg) was measured in a differential scanning calorimeter (DSC) according to ASTM D3418-03 and E1356-03, and was recorded from the second heat up using the half height method.

Determination of Heat of Fusion (ΔH)

The heat of fusion (ΔH) of polymer powder was determined as the area under the melting endotherm on the second heat scan in a differential scanning calorimeter (DSC) according to ASTM D3418-03 and E793-06, and using heating and cooling rates of 20° C./min. The heat of fusion (ΔH) is determined on the second heat scan and is taken as the area over a linear baseline drawn from above the glass transition temperature (Tg) to a temperature above end of the endotherm.

Determination of the Melt Viscosity

The melt viscosity was measured using a capillary rheometer pursuant to ASTM D3835 standard. Readings were taken after 10 minute dwell time at 410° C. and a shear rate of 46.3 s$^{-1}$ using a tungsten-carbide die with the following characteristics: diameter=1.016 mm, length=20.32 mm, cone angle=120°.

Thermal Properties of Polymer Powders

The thermal properties observed for the polymer powders of the Examples and Comparative Examples are shown in Table 4 below.

TABLE 4

| Example | Polymer | Tg (° C.) | Tc (° C.) | Tm (° C.) | ΔH fusion (J/g) (Powder) | ΔH fusion calculated (J/g) |
|---|---|---|---|---|---|---|
| CE1 | PEEK - KT-820 | 149 | 287 | 339 | 49 | 58 |
| CE2 | PEEK-PEDEK (95/5) | 150 | 288 | 335 | 56 | 55 |
| CE3 | PEEK-PEDEK (90/10) | 150 | 279 | 327 | 48 | 50 |
| CE4 | PEEK-PEDEK (85/15) | 151 | 261 | 320 | 47 | 45 |
| CE5 | PEEK-PEDEK (80/20) | 153 | 256 | 313 | 40 | 40 |
| CE6 | PEEK-PEDEK (75/25) | 153 | 242 | 305 | 30 | 35 |
| CE7 | PEEK-PEDEK (70/30) | 153 | 233 | 296 | 23 | 28 |
| CE8 | PEEK-PEDEK (60/40) | 157 | 232 | 317 | 28 | 43 |
| CE9 | PEEK-PEDEK (50/50) | 159 | 284 | 349 | 38 | 65 |
| CE10 | PEEK-PEDEK (40/60) | 159 | 322 | 371 | 50 | 79 |

TABLE 4-continued

| Example | Polymer | Tg (° C.) | Tc (° C.) | Tm (° C.) | ΔH fusion (J/g) (Powder) | ΔH fusion calculated (J/g) |
|---|---|---|---|---|---|---|
| CE11 | PEKK DS-E | 155 | ND* | ND | ND | — |
| 12 | PEEK-PEmEK (95/5) | 154 | 290 | 333 | 60 | 54 |
| 13 | PEEK-PEmEK (90/10) | 146 | 252 | 325 | 54 | 48 |
| 14 | PEEK-PEmEK (80/20) | 143 | 249 | 307 | 47 | 36 |
| 15 | PEEK-PEmEK (70/30) | 140 | 199 | 288 | 36 | 23 |
| 16 | PEEK-PEmEK (60/40) | 134 | 174 | 266 | 10 | 6 |
| 17 | PEEK-PEmEK (50/50) | 129 | ND | 253 | 3 | −3 |
| CE18 | PEEK-PEmEK (40/60) | 131 | ND | ND | ND | — |

*ND = Not detected. The composition was amorphous.

Table 4 includes melting point (Tm) and heat of fusion ΔH data for a variety of comparative PEEK-PEDEK copolymers and inventive PEEK-PEmEK copolymers over a range of PEEK/PEDEK and PEEK/PEmEK mole ratios. This heat of fusion (ΔH) and melting point (Tm) data is presented graphically in FIG. 1.

As shown in FIG. 1, as the relative amount of PEDEK repeat units in the PEEK-PEDEK copolymers of Comparative Examples 2 to 10 increased, the heat of fusion (ΔH) and melting temperatures (Tm) generally decreased from a high of ΔH=56 J/g and Tm=335° C. (Comparative Example 2, PEEK-PEDEK (95/5)) to a low of ΔH=23 J/g and Tm=296° C. (Comparative Example 7, PEEK-PEDEK (70/30)); however, from Comparative Examples 8 (PEEK-PEDEK (60/40)) to 10 (PEEK-PEDEK (40/60)), the trend reversed, and both heat of fusion (ΔH) and melting temperatures (Tm) increased.

In surprisingly contrast, as the relative amount of $R_{PEmEK}$ repeat units was increased over Examples 12 to 17, the inventive PEEK-PEmEK copolymers exhibited a much different behaviour. First, the PEEK-PEmEK copolymers achieved a higher heat of fusion (ΔH) for a given melting temperature (Tm) over the range 333° C. to 296° C. than did the comparative PEEK-PEDEK copolymers, and second, the PEEK-PEmEK copolymers unexpectedly achieved melting temperatures (Tm) as low as 43° C. lower than the lowest melting temperature (Tm) observed for the comparative PEEK-PEDEK copolymers. In other words, in contrast to the comparative examples, the PEEK-PEmEK copolymers of the invention were unexpectedly found to satisfy the inequality, $\Delta H \geq -0.0005(Tm)^2 + 1.008(Tm) - 226.33$, the boarder of which is represented by the curve $\Delta H = -0.0005(Tm)^2 + 1.008(Tm) - 226.33$ shown in FIG. 1.

Notably, the (40/60) PEEK-PEmEK copolymer of Comparative Example CE18 is not shown in FIG. 1 because it was amorphous and therefore did not have a heat of fusion (ΔH).

In addition, Examples 12 and 13 surprisingly exhibited melting temperatures (Tm) less than that of PEEK (Comparative Example 1) with heats of fusion as much as 28% greater than that observed for PEEK.

Evaluation of Molded Compositions

Type I ASTM tensile bars of the copolymers of Comparative Examples 1 and 7-11 and Examples 14-16 were injection molded on a Wasp Mini-jector® injection molding machine.

Determination of Tensile Properties

Tensile properties were measured according to ASTM D638 at room temperature low speed (0.2-in/min), except for Comparative Examples 5-7 (which were tested at high speed (2.0-in/min)) on as-molded and annealed specimens (200° C./3 h in air for CE1, and 180° C./3 h in air for Comparative Examples 5-7, 11, and Examples 14-16.

The specimens of Comparative Examples CE7-CE11 could not be annealed without significant deformation. Results are presented in Tables 5 and 6.

TABLE 5

Properties of As-Molded Compositions

| Composition | CE1 PEEK | CE7 PEEK-PEDEK (70/30) | CE6 PEEK-PEDEK (75/25) | CE5 PEEK-PEDEK (80/20) | CE11 PEKK DS-E | 14 PEEK-PEmEK (80/20) | 15 PEEK-PEmEK (70/30) | 16 PEEK-PEmEK (60/40) |
|---|---|---|---|---|---|---|---|---|
| Tm molded plaque (° C.) | 342 | 298 | 311 | 317 | 315 | 313 | 295 | 275 |
| Tensile Modulus, ksi, | 538 [3.05]* | 380 [1.68] | 391 [7.33] | 398 [1.97] | 515 [83] | 636 [18.4] | 618 [24.1] | 553 [54.3] |
| Tensile Strain at Break, %, | 37 [13] | 180 [54] | 240 [7.4] | 250 [3.7] | 84 [33] | 14 [9.4] | 7.9 [12] | 22 [7.9] |
| Tensile Strain at Yield, %, | 5.4 [0.08] | 5.7 [0.06] | 5.5 [0.15] | 5.4 [0.07] | 5.3 [0.17] | 4.1 [0.04] | 3.95 [—]** | 3.7 [0.2] |
| Tensile | 10800 | 12500 | 14400 | 14400 | 9980 | 12900 | 11300 | 9330 |

TABLE 5-continued

Properties of As-Molded Compositions

| Composition | CE1 PEEK | CE7 PEEK-PEDEK (70/30) | CE6 PEEK-PEDEK (75/25) | CE5 PEEK-PEDEK (80/20) | CE11 PEKK DS-E | 14 PEEK-PEmEK (80/20) | 15 PEEK-PEmEK (70/30) | 16 PEEK-PEmEK (60/40) |
|---|---|---|---|---|---|---|---|---|
| Strength at Break, psi, | [656] | [1740] | [192] | [119] | [832] | [851] | [2590] | [1120] |
| Tensile Strength at Yield, psi, | 13900 [40.3] | 10100 [28.0] | 10100 [52.0] | 10200 [76.0] | 12800 [65.8] | 14000 [60.9] | 13995 [—] | 11800 [148] |
| ΔH fusion (J/g) (molded plaque) | 41.3 | 8.2 | 7.9 | 9.0 | 6.5 | 36.7 | 35.6 | 18.7 |

*Standard deviations are shown in brackets.
**"[—]" indicates only one specimen yielded, so no standard deviation was calculated.

As shown in Table 5 above, when molded into plaques, the PEEK-PEmEK copolymers of the invention unexpectedly exhibited:
1) a significantly higher tensile modulus than any of the comparative polymers, including PEEK (Comparative Examples 1 and 7-11), and
2) heats of fusion significantly higher—as much as 300% higher—than any of the comparative low melting temperature (Tm) polymers of Comparative Examples 7 to 11.

TABLE 6

Properties of Molded Compositions After Annealing

| | CE1† | 14 | 15 | 16 |
|---|---|---|---|---|
| Tm (° C.) | 339 | 307 | 288 | 266 |
| Annealing T (° C.)/time (h) | 200/3 | 180/3 | 180/3 | 180/3 |
| Tensile Modulus, ksi, | 538 [3.05]* | 693 [10.9] | 661 [17] | 638 [35.7] |
| Tensile Strain at Break, %, | 37 [13] | 6.9 [6] | 1.5 [0.14] | 3.5 [3.3] |
| Tensile Strain at Yield, %, | 5.4 [0.08] | 3.74 [0.07] | NY** | 3.6 [—]*** |
| Tensile Strength at Break, psi, | 10800 [656] | 11800 [2870] | 8800 [684] | 8960 [709] |
| Tensile Strength at Yield, psi, | 13900 [40.3] | 14550 [18.65] | NY | 12435 [—] |
| ΔH fusion (J/g) | 41.1 | 41.5 | 35.6 | 25.3 |

*Standard deviations are shown in brackets.
**NY = Not yielding.
***"[—]" indicates that only one specimen yielded, so no standard deviation was calculated.
†The compositions of Comparative Examples CE7-CE11 were not evaluated after annealing because the annealing resulted in significant deformation of the specimens.

As shown in Table 6 above, after annealing, the PEEK-PEmEK copolymers of the invention exhibited:
1) a melting temperature (Tm) as much as 73° C. less than that of PEEK (Comparative Example 1),
2) a tensile modulus as much as 29% greater than that of PEEK, and
3) in the case of Examples 14 and 15, a heat of fusion (ΔH) on par with that of PEEK.

This surprising combination of properties make these materials particularly well suited for applications requiring a good chemical resistance and a lower processing temperature.

Metal Adhesion Testing

The following examples demonstrate the surprising improved ability of the PEEK-PEmEK copolymers to adhere to metals, as compared with PEEK.

The polymer compositions shown in Table 7 below were prepared by melt extrusion compounding. The ingredients of each composition were first tumble blended for about 20 minutes, followed by melt compounding using a 26 mm Coperion® co-rotating partially intermeshing twin screw extruder. The extrudate was stranded, cooled, and then pelletized.

Over-molded lap shear specimens were used to quantify the degree of adhesion of each of the polymer compositions to 4.5 mm long×1.75 mm wide×2 mm thick chemically etched (i.e. NMT-treated) A-6061 aluminum coupons obtained from Taiseiplas. A small rectangular bar specimen of polymer was over-molded onto the aluminum coupons using a three-plate mold manufactured and supplied by Taiseiplas Corp. The rectangular strip of plastic over-molded onto the aluminum coupons was 4.5 cm in length, 1.0 cm in width and 3.0 mm in thickness as nominal dimensions. The plastic piece was over-molded onto the aluminum coupons such that there was an overlap area between the two pieces of 10 mm×5 mm (nominal lap shear junction area of 50 mm$^2$).

The lap shear strength—also referred to as the "adhesion strength"—of each over-molded assembly was evaluated in an Instron® tensile testing apparatus according to ASTM D1002. A positioning fixture supplied by Taiseiplas was used to hold the assembly in place in the Instron® grips and to maintain the alignment of the metal and plastic pieces during the tensile pull on the two materials to assure that the force applied on the lap interface of the plastic-metal junction was a purely shear force. A pull rate of 0.05 in/min was used, and the lap shear strength of each specimen was calculated by dividing the load needed to break apart each over-molded assembly by the nominal overlap area of the joint (50 mm²). Eight specimens were tested for each composition, and the results were reported as an average with standard deviation.

The heats of fusion of the compositions were also measured as described above.

TABLE 7

| Adhesion Strength | | |
|---|---|---|
| Components | CE17 | E18 |
| KetaSpire ® PEEK KT-880P (wt. %) | 70.0* | — |
| PEEK-PEmEK 80/20 (wt.%) | — | 70.0 |
| Fiberglass, AGY S2 9 um 553 Sizing (wt. %) | 30.0 | 30.0 |
| Adhesion Results | | |
| Lap Shear Strength (MPa) | 8.1 | 18.4 |
| Lap Shear Std. Dev. (MPa) | 3.8 | 5.3 |
| Heat of fusion (ΔH) (J/g) | 57.0 | 51.6 |

As shown in Table 7 above, the PEEK-PEmEK copolymer composition of Example E18 unexpectedly exhibited a 127% greater lap shear strength and only a 9% lower heat of fusion (ΔH) as compared with the PEEK composition of Comparative Example CE17.

Should the disclosure of any patents, patent applications, and publications which are incorporated herein by reference conflict with the description of the present application to the extent that it may render a term unclear, the present description shall take precedence.

The invention claimed is:

1. A polymer-metal junction, comprising:
a metal substrate in contact with
a polymer composition comprising a PEEK-PEmEK copolymer, the copolymer comprising at least 50 mol %, collectively, of repeat units ($R_{PEEK}$) and repeat units ($R_{PEmEK}$), relative to the total number of repeat units in the PEEK-PEmEK copolymer, wherein:
(a) repeat units ($R_{PEEK}$) are repeat units of formula (A):

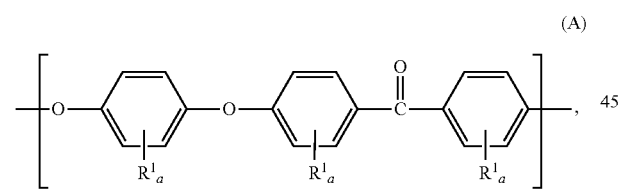

(A)

and
(b) repeat units ($R_{PEmEK}$) are repeat units of formula (B):

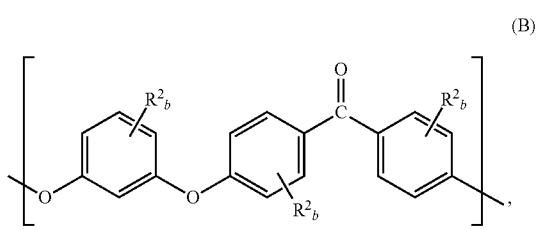

(B)

wherein:
each $R^1$ and $R^2$, equal to or different from each other, is independently at each occurrence selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium,
each a and b is independently selected from the group consisting of integers ranging from 0 to 4,
the PEEK-PEmEK copolymer includes the repeat units $R_{PEEK}$ and $R_{PEmEK}$ in a molar ratio $R_{PEEK}/R_{PEmEK}$ ranging from 95/5 to 45/55,
the PEEK-PEmEK copolymer has a heat of fusion of at least 15 J/g, and
the PEEK-PEmEK copolymer meets the following inequality:

$$\Delta H \geq -0.0005(Tm)^2 + 1.008(Tm) - 226.33$$

wherein:
ΔH is the heat of fusion of PEEK-PEmEK copolymer in J/g, and
Tm is the melting temperature of the PEEK-PEmEK copolymer in °C. measured as the peak temperature of the melting endotherm on the second heat scan in a differential scanning calorimeter (DSC) according to ASTM D3418-03 and E794-06 and using heating and cooling rates of 20° C./min.

2. The polymer-metal junction of claim 1, wherein the repeat units ($R_{PEEK}$) are repeat units of formula:

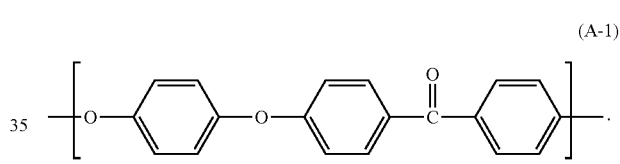

(A-1)

3. The polymer-metal junction of claim 1, wherein the repeat units ($R_{PEmEK}$) are repeat units of formula:

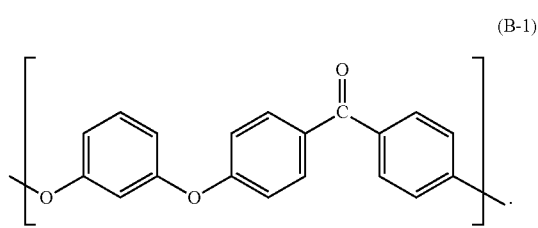

(B-1)

4. The polymer-metal junction of claim 1, wherein the polymer composition further comprises at least one of a reinforcing filler, an additive different from the reinforcing filler, or a combination thereof.

5. The polymer-metal junction of claim 4, wherein the polymer composition further comprises the at least one reinforcing filler.

6. The polymer-metal junction of claim 5, wherein the at least one reinforcing filler comprises a glass fiber, a carbon fiber, or a combination thereof.

7. The polymer-metal junction of claim 4, wherein the polymer composition comprises at least 10 wt. % of the reinforcing filler.

8. The polymer-metal junction of claim 4, wherein the polymer composition comprises at least 20 wt. % of the reinforcing filler.

9. The polymer-metal junction of claim 4, wherein the polymer composition comprises at most 50 wt. % of the reinforcing filler.

10. The polymer-metal junction of claim 1, wherein the composition comprises at least 10 wt. % of PEEK-PEmEK copolymer, based on the total weight of the polymer composition.

11. The polymer-metal junction of claim 1, wherein the metal substrate comprises a nano-structured metal surface.

12. The polymer-metal junction of claim 1, wherein the polymer-metal junction exhibits a lap shear strength of at least 15 MPa as measured according to ASTM D1002.

13. The polymer-metal junction of claim 1, wherein the polymer-metal junction exhibits a lap shear strength of at least 16 MPa as measured according to ASTM D1002.

14. The polymer-metal junction of claim 1, wherein the polymer-metal junction exhibits a lap shear strength of at least 17 MPa as measured according to ASTM D1002.

15. The polymer-metal junction of claim 1, wherein the polymer-metal junction is a coating on a wire or cable or a part of a mobile electronic device.

16. The polymer-metal junction of claim 1, wherein the PEEK-PEmEK copolymer comprises at least 90 mol %, collectively, of repeat units ($R_{PEEK}$) and repeat units ($R_{PEmEK}$), relative to the total number of repeat units in the PEEK-PEmEK copolymer.

17. The polymer-metal junction of claim 1, wherein the PEEK-PEmEK copolymer comprises at least 95 mol %, collectively, of repeat units ($R_{PEEK}$) and repeat units ($R_{PEmEK}$), relative to the total number of repeat units in the PEEK-PEmEK copolymer.

18. The polymer-metal junction of claim 1, wherein the PEEK-PEmEK copolymer comprises at least 99 mol %, collectively, of repeat units ($R_{PEEK}$) and repeat units ($R_{PEmEK}$), relative to the total number of repeat units in the PEEK-PEmEK copolymer.

19. The polymer-metal junction of claim 1, wherein the PEEK-PEmEK copolymer further comprises repeat units ($R_{PAEK}$) different from repeat units ($R_{PEEK}$) and repeat units ($R_{PEmEK}$), wherein the repeat units ($R_{PAEK}$) comply with any of the following formulae (K-A) to (K-M):

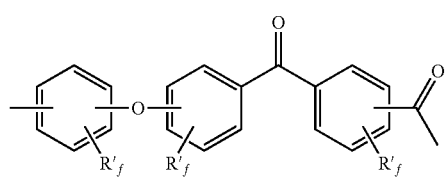
(K-A)

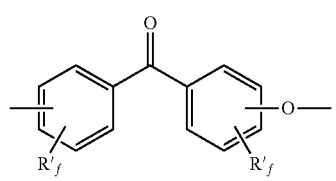
(K-B)

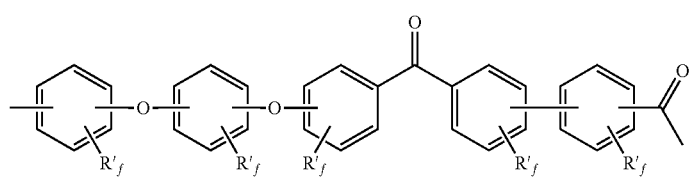
(K-C)

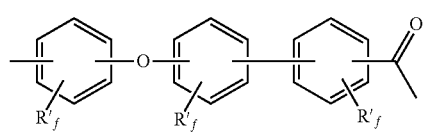
(K-D)

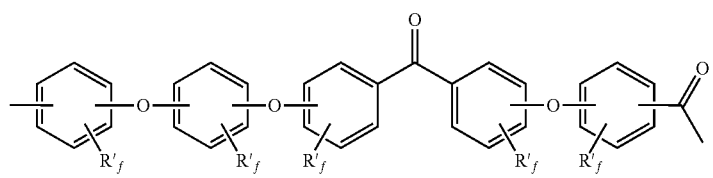
(K-E)

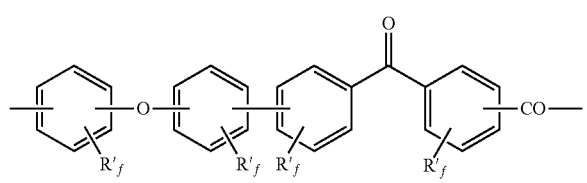
(K-F)

-continued

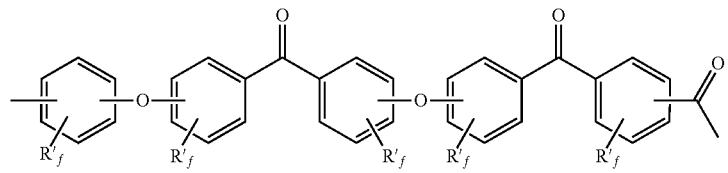
(K-G)

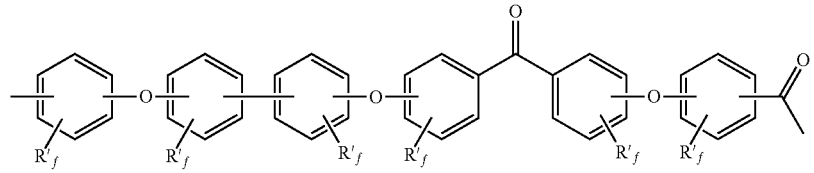
(K-H)

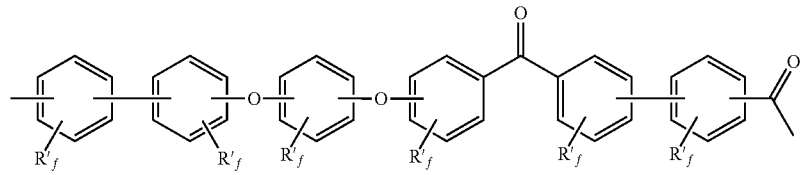
(K-I)

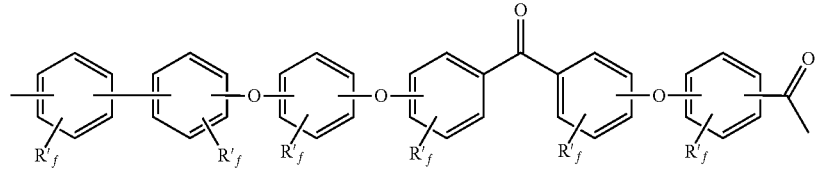
(K-J)

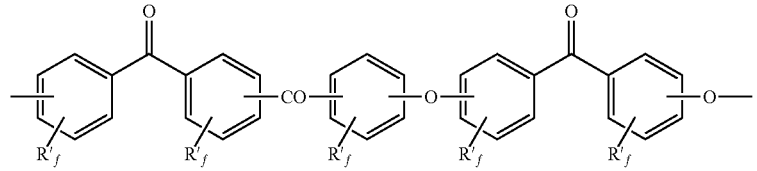
(K-K)

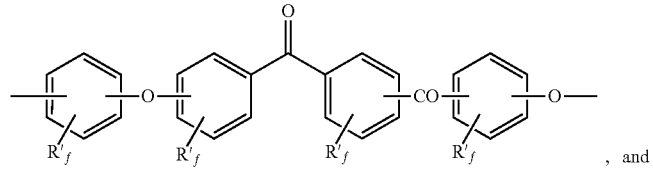
(K-L)

, and

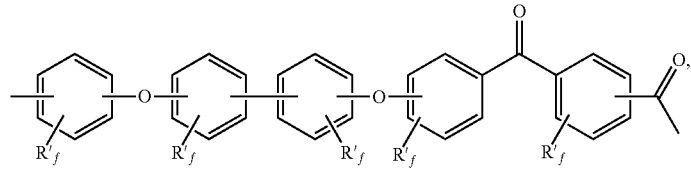
(K-M)

wherein in each of formulae (K-A) to (K-M) above, each of R', equal to or different from each other, is independently selected at each occurrence from a $C_1$-$C_{12}$ group optionally comprising one or more than one heteroatoms selected from the group consisting of; sulfonic acid and sulfonate groups; phosphonic acid and phosphonate groups; amine and quaternary ammonium groups; and each of j', equal to or different from each other, is independently selected at each occurrence from the group consisting of integers ranging from 0 to 4.

20. The polymer-metal junction of claim 1, wherein the PEEK-PEmEK copolymer includes the repeat units $R_{PEEK}$ and $R_{PEmEK}$ in a molar ratio $R_{PEEK}/R_{PEmEK}$ ranging from 90/10 to 50/50.

21. The polymer-metal junction of claim 1, wherein the PEEK-PEmEK copolymer includes the repeat units $R_{PEEK}$ and $R_{PEmEK}$ in a molar ratio $R_{PEEK}/R_{PEmEK}$ ranging from 85/15 to 58/42.

22. The polymer-metal junction of claim 1, wherein the PEEK-PEmEK copolymer exhibits a tensile modulus of at least 600 ksi as measured according to ASTM D638 at room temperature.

23. The polymer-metal junction of claim 1, wherein the proportion of PEEK-PEmEK copolymer in the polymer composition is at least 50 wt. %.

24. The polymer-metal junction of claim 1, wherein the proportion of PEEK-PEmEK copolymer in the polymer composition is at least 60 wt. %.

25. A shaped article comprising the polymer-metal junction of claim 1.

26. A method of making the shaped article of claim 25, comprising forming the shaped article by an additive manufacturing process.

* * * * *